United States Patent [19]

Schlagel

[11] 4,058,199
[45] Nov. 15, 1977

[54] IN-MASS CONVEYOR WITH INTERMEDIATE DISCHARGE

[75] Inventor: William A. Schlagel, Coon Rapids, Minn.

[73] Assignee: Schlagel, Inc., Cambridge, Minn.

[21] Appl. No.: 711,438

[22] Filed: Aug. 4, 1976

[51] Int. Cl.$^2$ ............................................. B65G 19/08
[52] U.S. Cl. .................................. 198/370; 198/532; 198/735
[58] Field of Search .............. 198/359, 360, 366, 369, 198/370, 530, 531, 532, 569, 733, 735; 251/228, 252, 299, 300, 301, 303

[56] References Cited

U.S. PATENT DOCUMENTS

| 846,596 | 3/1907 | Moore | 198/370 |
|---|---|---|---|
| 912,887 | 2/1909 | Pool | 198/530 |
| 1,885,656 | 11/1932 | Wallace | 198/569 |
| 1,899,791 | 2/1933 | Brennen | 198/569 |
| 2,155,306 | 4/1939 | Ferguson | 198/733 |
| 2,311,747 | 2/1943 | Gooch, Jr. | 198/532 |
| 2,380,384 | 7/1945 | Briggs | 198/733 |
| 3,061,073 | 10/1962 | Wickam | 198/735 |
| 3,261,373 | 7/1966 | Ridenour | 251/228 |
| 3,351,180 | 11/1967 | Herzog et al. | 198/370 |
| 3,774,751 | 11/1973 | Bakker | 198/735 |

FOREIGN PATENT DOCUMENTS

| 718,730 | 9/1965 | Canada | 198/530 |
|---|---|---|---|
| 1,370,308 | 10/1974 | United Kingdom | 198/530 |

Primary Examiner—Evon C. Blunk
Assistant Examiner—Richard K. Thomson
Attorney, Agent, or Firm—James R. Cwayna

[57] ABSTRACT

A conveyor device particularly designed for the conveying of mass loads such as grains, powders and the like which may be termed semi-solids which device includes an extending housing having a substantially flat support bed with a conveying mechanism engaging the upper surface thereof for the conveying of material thereover and wherein the conveying elements are of a predetermined minimal height in comparison to the load or height of material in the conveyor which is to be conveyed and an intermediate discharge for the conveyor which is arranged on the support bed thereof which includes a pair of door members hinged at their respective ends and opening downwardly from their mating edge which doors extend the full width of the conveyor and which are interlinked for simultaneous opening and closing to provide in their closed condition a smooth surface continual with the support bed of the the conveyor and which provide when open, an opening without ledges or other areas in which material may lie or become lodged and which will insure the entire discharge of the conveyor as the driving member moves the material thereacross.

5 Claims, 7 Drawing Figures

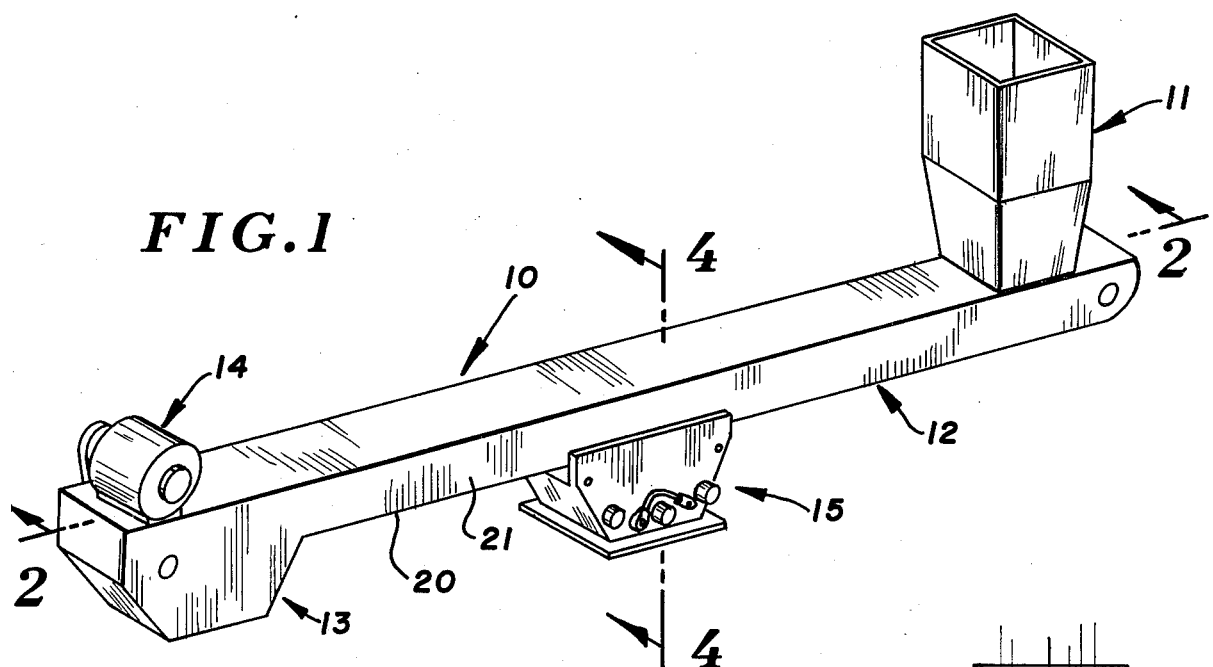
FIG. 1
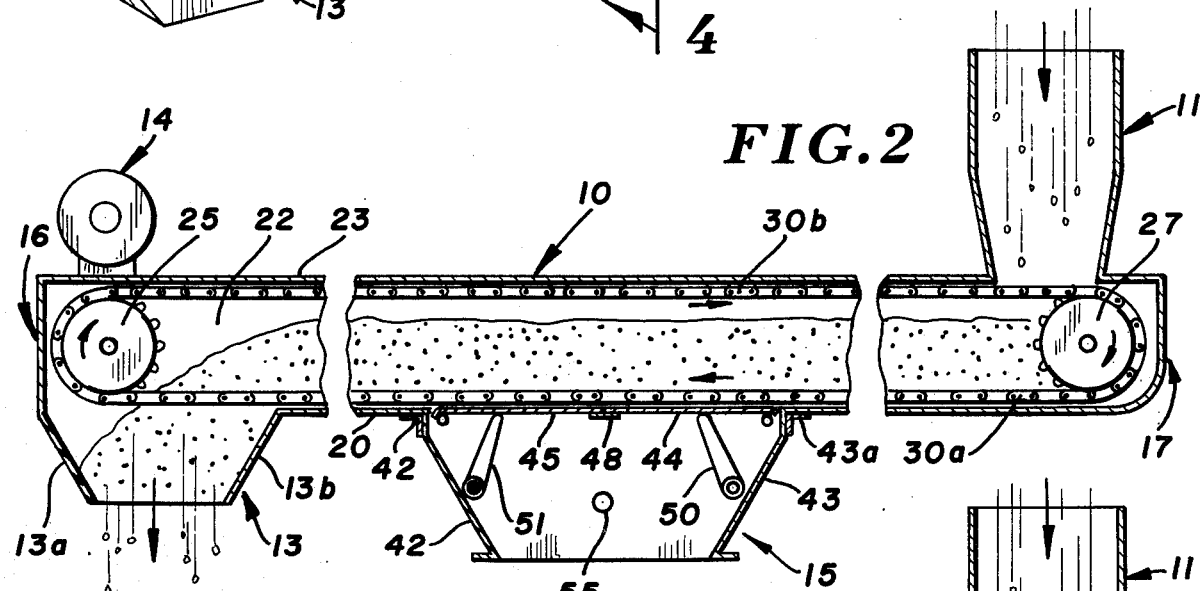
FIG. 2
FIG. 3

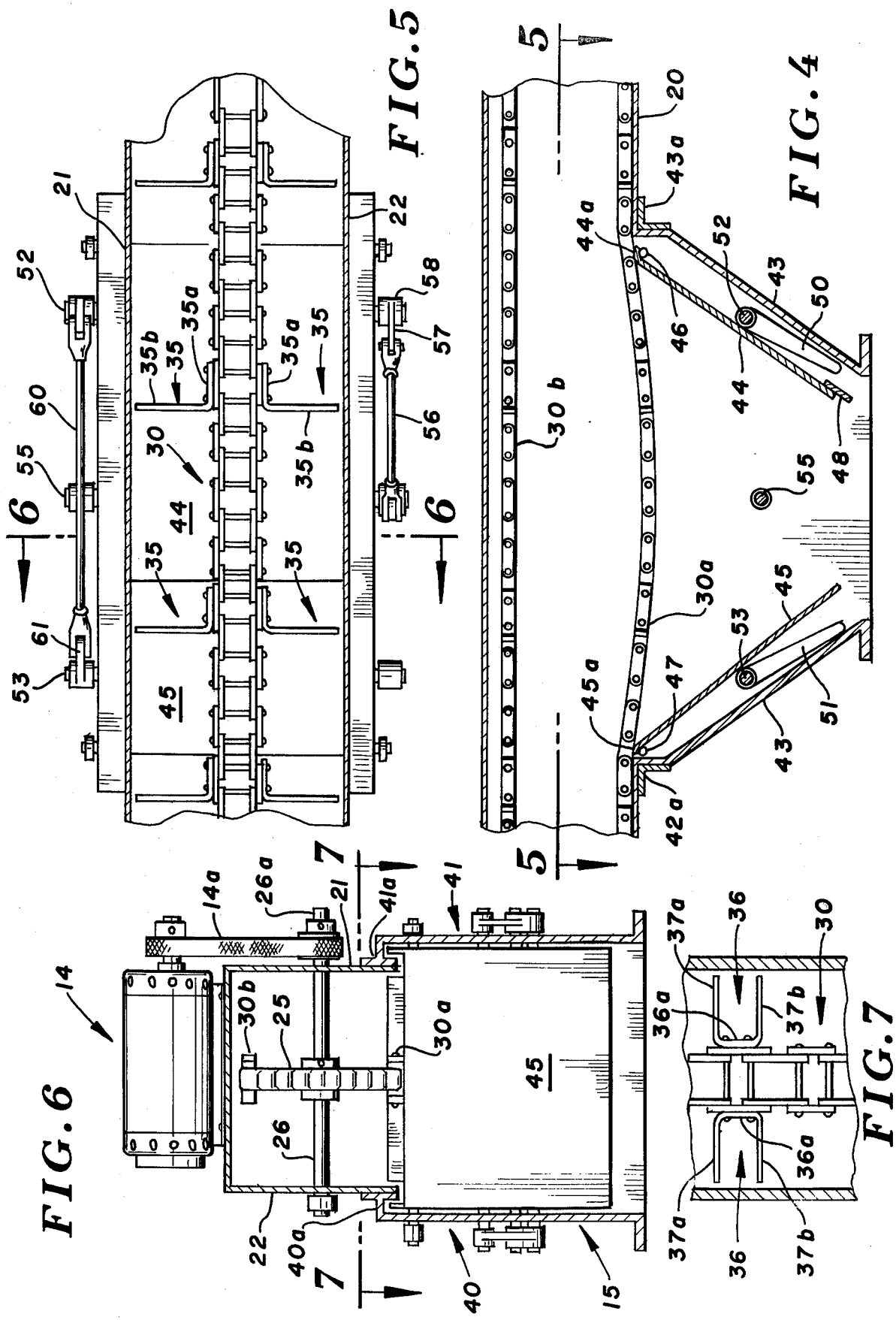

IN-MASS CONVEYOR WITH INTERMEDIATE DISCHARGE

FIELD OF THE INVENTION

This invention relates generally to material conveying devices and more particularly to closed housing type conveyors provided to transfer materials in an in-mass condition and including an opening intermediate the ends thereof which may be selectively opened to discharge at a point other than the normal delivery end of the unit.

BACKGROUND AND OBJECTS OF THE INVENTION

Applicant provides herein a conveyor unit particularly designed for what may be termed in-mass conveying with a discharge arranged to facilitate discharge of the material along the length of the conveyor and which discharge is particularly designed to facilitate in-mass conveying when the same is closed but also to insure full discharge when the same is open. The discharge also is designed specifically to accommodate full discharge without increasing the normal installation width of the unit.

In-mass conveying is a term related to the conveying of semi-solid materials such as grains, powders and the like. With conveyors utilized to transfer and convey such material, the helical screw or bucket type of conveyor are often utilized. With applicant's concept, conveying is accomplished through a driving member having a plurality of drive bars or the like thereon which drive bars are of a first predetermined height and the material may be well above this height but the conveying force is transmitted through the material and even though the height of the driving bars is quite low as compared to the height of the material, the entire material will be driven in-mass due to the coaction of the material itself.

With the conveying of material to which applicant's device is directed, that being grains, powders and other similar products, it is essential that the material not become contaminated by other materials. In other words, after use, the conveyor should be substantially self cleaning. In order to accomplish one factor of self cleaning, applicant provides an intermediate discharge which is of a specific design so that when the same is in a closed position, the material being conveyed to a normal end discharge will flow smoothly thereacross thus not interrupting the in-mass conveying concept and such discharge is free of ledges or capture areas for material passing thereover and will further, when open, insure total discharge of material being carried by the conveyor element.

With applicant's conveyor device the discharge unit is designed to underlie the conveyor and to open directly therebelow such that normally provided, outwardly pullable sides or slides are not necessary and therefore the intermediate discharge will not increase the required operating width of the unit.

The primary aspects and objects of applicant's invention are to provide a conveyor device particularly directed to the in-mass conveying of material and to provide an intermediate discharge in connection therewith which will insure complete discharge of material therefrom upon opening of the same but will insure continuous in-mass conveying of material thereover when the same is in closed position.

It is therefore an object of applicant's invention to provide a conveyor unit particularly designed for in-mass conveying of semi-solid materials and to provide a discharge therefore which may be arranged in position along intermediate portions of the length of the conveyor.

It is a further object of applicant's invention to provide a conveyor system for the in-mass conveying of various materials and particularly designed for the in-mass conveying of semi-solid materials in which drive members are provided to propel the material along a substantially smooth support area and wherein the drive members will provide a driving force to material of a greater height than the drive members.

It is a further object of applicant's invention to provide an intermediate discharge for conveyors which provides a pair of underlying doors normally cammed into a substantially flat position with the remaining support portion of the conveyor to provide a continuous, relatively unbroken surface for the in-mass conveying of materials tnereacross.

It is still a further object of applicant's invention to provide a conveyor unit having an intermediate discharge which conveyor is provided with a driving member having a lower driving run normally supported by the door sections of the discharge when they are in their closed position and serving to properly guide the chain upwardly from the open area onto the remaining support floor of the conveyor when the doors are in open position such that travel of the drive member across the open area will cause a minimal amount of disturbance in the smooth flow of the driving section.

It is still a further object of applicant's invention to provide an underlying discharge to be intermediately mounted along the length of a conveyor and opening directly therebelow such that the discharge unit will not require any greater width than the conveyor itself to provide a full discharge opening to the conveyor.

These and other objects and advantages of the invention will more fully appear from the following description made in connection with the accompanying drawings in which the same numberal is used to designate the same or similar parts throughout the several views, and in which:

FIG. 1 is a perspective view of a conveyor designed for in-mass conveying of material and having an intermediate discharge embodying applicant's concepts arranged thereon;

FIG. 2 is a longitudinal section taken substantially along Line 2—2 of FIG. 1 and illustrating the intermediate discharge portion of the conveyor in closed position;

FIG. 3 is a section similar to FIG. 2 illustrating the intermediate discharge position in an open position;

FIG. 4 is a section of a portion of FIG. 3 drawn to an enlarged scale;

FIG. 5 is a horizontal section taken substantially along Line 5—5 of FIG. 4;

FIG. 6 is a vertical section taken substantially along Line 6—6 of FIG. 5; and

FIG. 7 is a horizontal section taken substantially along Line 7—7 of FIG. 6 illustrating a second form of the material engaging and drive members.

In accordance with the accompanying drawings, applicant's conveyor unit is illustrated in a form having one intermediate discharge with the entire unit being designated 10, a filler or hopper end generally designated 11, a housing 12 extending from the hopper or filler end 11 to a delivery end 13 with a motor or other driving device 14 being mounted adjacent the deliver end 13 for driving of the conveying portions of the unit within the housing 12. The intermediate discharge 15 is arranged at an intermediate location of the housing 12 and as will be obvious from the discussion hereinafter, this intermediate housing 15 or a plurality of such units may be located at any position along the length of the housing 12. The conveyor unit 10 and particularly the housing 12 therefore includes a substantially enclosed or enclosable housing having a bottom supporting bed 20, upstanding sides 21, 22 and a top member 23. The bottom or support bed 20 is substantially flat and continuous and therefore should be relatively seamless or uninterrupted such that material being conveyed thereover will flow in what is known as an in-mass configuration.

In-mass conveying basically deals with grains and other what may be termed semi-solids which will form together and combine together to form a unit rather than to provide for individually conveyed elements. In in-mass conveying, the coaction between the granular substances being conveyed actually permits the material to be moved as a total bulk with the application of power thereto at selected segments or portions of the bulk area. The principal of such conveying mechanisms is illustrated in FIGS. 2 and 3 wherein the bulk of material being conveyed is illustrated in phantom configuration and illustrates the same as substantially filling the height of the housing and being carried as a body therethrough with a simple carrier mechanism driving only the layer or layers adjacent the bottom or support bed 20 which driving force is provided through the coaction of the material upwardly through the entire bed of material such that the entire bed will move as a mass. From these simple illustrations, it should be obvious that any disruptive surfaces along the carrier portions thereof which include the support bed 20 and the carrier or driving element could prevent proper coaction between the granular elements and therefore disrupt this body concept.

The structure illustrated in FIG. 2 illustrates the intermediate discharge 15 in closed position and in FIG. 3 in open position. As illustrated in FIG. 2, the mass of material is carried to the discharge end 13 of the conveyor which includes downwardly diverging plate members 13a, 13b and cooperative side elements closing thereagainst to form a generally trapezoidal opening for the discharge of material. A closure end plate 16 is provided on the housing adjacent the delivery end thereof and an additional closure plate 17 is provided on the hopper end 11 of the conveyor unit to provide a fully closed longitudinally extending housing for the transmission of the material.

As illustrated in FIGS. 2 and 3, the conveying mechanism interiorly of the housing 12 includes a first drive sprocket 25 which is mounted upon a drive shaft 26 which extends through and is bearingly mounted upon the sides 21, 22 of the housing and having one end 26a extending therefrom to be driven by a source of rotary power 14 through a belt drive 14a or the like. It should be noted that, in the form shown, only a single drive sprocket mechanism 25 is illustrated mounted generally centrally of the housing and this is pertinent to the type of continuous driving element used in applicant's conveyor. An idler sprocket 27 is provided on the hopper or receiving end of the conveyor 10 and the drive element which is designated 30 is designed obviously to encircle both of the sprocket elements 25, 27 to move interiorly of the housing 10 and drive the material therealong. It should be noted that the size of the sprockets and the particular placement thereof is designed to place what may be termed the lower run or driving run 30a of the drive element 30 adjacent to and to ride upon lower support surface 20 of the housing 12. The particular continuous driving element 30 consists of a chain element having bearing plates and pinning elements therebetween such that the teeth of the drive sprocket 25 and the idler sprocket 27 will engage between appropriate roller elements for driving the chain and which will permit certain take-up of the chain for sizing thereof and therefore joining of the chain at certain points.

In order to drive the material in the in-mass condition, two particular forms of drive bars or material engaging elements are provided. The first of these bars is illustrated in FIG. 5 wherein an L-shaped member designated generally 35 is provided on each side of the drive chain 30 and is attached thereto with one leg, 35a, thereof secured to the chain element with the other leg, 35b, thereof extending laterally outwardly therefrom to ride in slightly spaced relationship from the sides 21, 22 of the housing 12. As illustrated in FIG. 5, a plurality of these individual drive bars 35 are provided in spaced relationship and in paired relationship on the drive chain 30. This particular L-shaped configuration is utilized for conveyor housings of what may be termed a large width while the double tined structure illustrated in FIG. 7 is utilized for conveyors of smaller widths. In the structure illustrated in FIG. 7, the conveying element is designated 36 and consists in this case of a U-shaped element having the connecting leg 36a thereof arranged to be attached to the driving chain element with the bifurcated legs 37a, 37b extending outwardly therefrom in spaced relationship to provide a pair of dual driving elements in spaced relation along the driving chain 30.

In operation of the conveyor unit and utilizing only the end discharge unit 13 thereof, it should be obvious that the particular diametric sizing of the sprockets 25, 27 in relationship to the height of the housing 12 of the conveyor will provide that the lower run 30a thereof is substantially in engagement with the lower support bed 20 of the housing and will substantially slide thereover when in motion while the upper run 30b thereof is in close proximity to the upper surface 23 of the housing 12 and will normally overlie the depth of material being conveyed and being driven by the lower run 30a of the conveyor unit. In the in-mass conveying system, it is essential that the lower support bed and the driving element be in close adjacent relationship during the driving of material so that the lower element will not climb upon the material and disrupt the in-mass bed. This could not only cause damage to the material being conveyed but could also disrupt the proper flow of the material. The applicant has found that the height of the individual drive elements 35 and 36 may be approximately 1/5 to 1/10 of the desired height of the bed to be removed.

The intermediate discharge has been designated in its entirety 15. This discharge unit is designed to be mounted at any position along the longitudinal length of the conveyor housing 12 and will provide when properly installed therein a continuance of the bottom support surface 20 of the conveyor to permit proper total transfer of the in-mass material therein to the end discharge 13 of the unit or will, when open, provide a complete discharge area for the material being carried thereto by the lower conveying element.

As illustrated in the accompanying drawings, the intermediate discharge unit includes a pair of side elements generally trapezoidal in configuration and which are designated 40, 41 with inwardly and downwardly slanting end elements 42, 43 combining therewith to provide a funnel shape for the discharge of material. As illustrated in FIG. 6, the sides 40, 41 are provided with attachment T sections 40a, 41a which will abut with and permit attachment of the discharge unit 15 to the sides 21, 22 of the housing 12 and will also provide a slight outward extension from the normal width of the housing 12 such that the closure doors 44, 45 will seal, in closing position, directly against the bottom most edge of the side elements 21, 22 and be in close alignment with the remaining portions of the bottom surface 20 of the housing such that continuity of flow and the support surface 20 will exist when the same are in their closed position. Further attachment areas 42a, 43a are provided on the upper ends of the downwardly, inwardly slanting end sections 42, 43 of the discharge to permit attachment thereof to the bottom-most surfaces of the housing and from the design of the side T sections 42a, 41a and the angle sections 42a, 43a it should be obvious that the intermediate discharge may be attached at any position along the conveyor housing after the same has been manufactured simply by cutting an opening in the bottom support surface 20 and making the attachment of the intermediate housing thereto, as no internal structure must be modified to otherwise permit the attachment thereof to the housing 12.

The closure door sections 44, 45 are best illustrated in FIG. 4 which shows that the upper most ends 45a, 44a thereof are designed to be rotatably mounted about pins 46, 47 in slightly spaced relation to the end attachment elements 42a, 43a such that when the doors 44, 45 are closed, they will be in alignment with the lower surfaces of the housing and one of the door elements, in this case, 44, is provided with an overlap configuration or extending lip 48 on the end thereof which will underlie the end of the opposite door 45 when the same is in closed position.

In order to provide for opening and closing for the door members 44, 45, a pair of cam elements 50, 51 which shafts extend through the discharge in a lateral direction such that control rods and the like may be attached to the outer ends thereof for simultaneous operation of the cams 50, 51. The camming elements 50, 51 are attached to the shafts 52, 53 for rotation therewith and the timing of the camming elements permits one of the doors, in this case, 45, to be moved into closure position slightly in advance of door 44 such that the underlying lip 48 of door 44 will underlie the door 45.

A control rod 55 is provided to extend laterially through the intermediate discharge housing and a first control link 56 is provided to extend from this rod to a connecting ear 57 of a control link 58 arranged on the first shaft 52 controlling camming element 50. Obviously, rotation of the shaft 55 will cause rotation of the linkage 56, 57 and 58 to rotate shaft 52 and thereby move the control cam 50 either upwardly or downwardly to shift the position of the door 44. A second connecting link 60 is provided from the opposite end of shaft 52 and this link extends to a control ear 61 on shaft 53 to move the same in conjunction with the rotation of control shaft 55 to similarly shift the door 45 in response to rotation of the camming link 51 on shaft 53. Although not specifically illustrated, the arrangement of the control linkages and the main operating shaft 55 is such as to provide an over center locking configuration to the linkage arrangement. This arrangement also provides a sequential timing between the shifting of cams 50, 51 such that cam 51 will advance the door 45 slightly over the movement of the door 44 for closure thereof prior to closure of door 44 such that the lip 48 will close under the bottom of door 45.

The particular positioning of the doors, the length of the intermediate discharge and the opening provided thereby all assist in proper operation of the conveyor unit in that the doors 44, 45 will provide a smooth flow for the lower element 30a of the conveying mechanism in that a smooth upper end 44a of the door 44 will assist in any sag of the chain and the opposite door 45 in its open position will provide a ramp for smooth continual flow of the drive element 30a upwardly thereacross and onto the continuing lower support surface 20 of the lower housing. This particular effect is of importance in the in-mass conveying and particularly when the lower drive mechanism 30a of the conveyor is and normally rides on the bottom surfac3 20 of the housing.

With the intermediate arrangement provided in applicant's device, it should be noted that the doors from a portion of the support bed in their closed position and when open, provide a gap of sufficient length to insure that the total material being carried in the in-mass configuration will be discharged therethrough. The opening of the doors permits total discharge of the in-mass flow and as previously stated, the opening of the doors being directly below the conveyor, do not require any additional width for installation of the unit. This width consideration is of prime importance.

It should be obvious that applicant has provided a unique conveyor and discharge arrangement for the in-mass conveying of granulated or semi-solid materials and the like which provides a relatively totally enclosed housing for such conveying with the selectivity of an intermediate discharge any place therealong which discharge in its closed condition will not affect or hamper the flow of the material or the conveying mechanism thereacross.

What I claim is:

1. A conveyor for conveying material in-mass and including at least one intermediate discharge along the length thereof, said conveyor including:
    a. a longitudinally extending housing having a receiving end and a discharge end, said housing including a substantially planar, material support section, upstanding side sections and a top;
    b. a continuous, material conveying element arranged within said housing and providing an upper and a lower run portion, said lower run portion being arranged in close association to said housing material support section for travel thereover;
    c. means arranged on the respective ends of said housing and carrying said material conveying element;
    d. means driving one of said carrying means to impart motion to said material conveying element;
    e. said material conveying element including a generally centrally arranged connecting member and a plurality of laterally extending, upstanding material engaging elements;

f. at least one intermediate discharge arranged between said ends of said housing and extending directly downwardly therefrom, said intermediate discharge including a downwardly extending housing having sides engaging said planar, material support section and having a door structure in planar alignment with said planar support section, said door structure forming said planar support section within said housing;

g. said door structure including a pair of door members each being rotatably mounted on transversely extending pivot means, said pivot means being arranged on the ends of said door members adjacent the planar support section, the length of said doors providing an opening the entire width of said housing when the same are in open position; and, h. common actuating means arranged in association with said doors for sequentially closing the same into alignment with said planar support section, said actuating means including camming means associated with and operating against the bottom of said doors to shift the same upwardly, said camming means being spaced from said pivot mounting means for said doors.

2. The structure set forth in claim 1 and said common actuating means including linkage means connected to said camming means.

3. The structure set forth in claim 1 and said camming means being arranged to lift said doors into closed position and allowing opening of the same through gravity.

4. The structure set forth in claim 1 and said camming means allowing said doors to open downwardly angularly with respect to said planar support section such that a downwardly and upwardly directed ramp is provided for the material carrying element moving across the opening formed thereby.

5. The structure set forth in claim 1 and one of said doors having an underlying closure and support lip on one end thereof to underlie the other said door when the same are in closed position.

* * * * *